United States Patent [19]
Conn et al.

[11] Patent Number: 5,360,158
[45] Date of Patent: Nov. 1, 1994

[54] METHOD FOR JOINING ALUMINUM ALLOY TUBES

[75] Inventors: Paul J. Conn, Grand Island; William J. Schrameck, East Amherst, both of N.Y.

[73] Assignee: The S.A. Day Mfg. Co., Inc., Buffalo, N.Y.

[21] Appl. No.: 92,231

[22] Filed: Jul. 15, 1993

[51] Int. Cl.⁵ .......................................... B23K 35/365
[52] U.S. Cl. .................................... 228/56.3; 228/224
[58] Field of Search ...................... 228/224, 56.3, 41

[56] References Cited

U.S. PATENT DOCUMENTS

| | | | |
|---|---|---|---|
| 3,172,385 | 3/1965 | Varsane | 228/224 |
| 3,439,859 | 4/1969 | Filson | 228/56.3 |
| 3,703,254 | 11/1972 | Maierson et al. | 228/56 |
| 4,624,866 | 11/1986 | Cheng et al. | 427/190 |
| 4,762,674 | 8/1988 | Cheng et al. | 376/405 |
| 4,807,799 | 2/1989 | Myong et al. | 228/212 |
| 4,901,909 | 2/1990 | George | 228/224 |

FOREIGN PATENT DOCUMENTS

| | | | |
|---|---|---|---|
| 57-41882 | 3/1982 | Japan | 228/183 |
| 683818 | 12/1952 | United Kingdom | 228/56.3 |

OTHER PUBLICATIONS

"A Guide To Preform Soldering", Alloys Unlimited, Inc., Long Island City, N.Y., 1959.

*Primary Examiner*—P. Austin Bradley
*Assistant Examiner*—Jeffrey T. Knapp
*Attorney, Agent, or Firm*—Gary M. Hartman; Domenica N. S. Hartman

[57] ABSTRACT

The present invention utilizes a novel flux-coated alloy member that is particularly adapted to be selectively positioned at the braze joints of a tube-and-center type heat exchanger. The flux-coated alloy member is suitably sized and shaped to place a predetermined quantity of flux compound and brazing alloy at the braze joints, so as to avoid the presence of excess flux compound and brazing alloy which may otherwise have a detrimental effect on the quality of the braze joints subsequently formed during a brazing operation. The flux coating of this invention is hard and durable, and is composed of potassium tetrafluoroaluminate particles which are dispersed in either a natural resin or a water soluble epoxy resin.

13 Claims, 2 Drawing Sheets

METHOD FOR JOINING ALUMINUM ALLOY TUBES

The present invention relates to an improved method for soldering or brazing one or more aluminum tubes together or to a second member, such as for the purpose of assembling heat exchangers used as engine radiators and air conditioning condensers. More particularly, this invention relates to improved techniques for the formation of the external joints of a heat exchanger, wherein a flux-coated brazing alloy ring is positioned at the joint sites during assembly and prior to brazing of the heat exchanger, so as to selectively place a flux compound and brazing alloy at the joint sites prior to brazing.

BACKGROUND OF THE INVENTION

Heat exchangers are routinely employed within the automotive industry, such as in the form of radiators for cooling engine coolant, condensers and evaporators for use in air conditioning systems, and heaters. In order to efficiently maximize the amount of surface area available for transferring heat between the fluid within the heat exchanger and the environment, the design of the heat exchanger is typically of a tube-and-fin type containing a number of tubes which thermally communicate with high surface area fins. The fins enhance the ability of the heat exchanger to transfer heat from the fluid to the environment, or vice versa. Increasingly, heat exchangers used in the automotive industry are being formed from aluminum alloys so as to help reduce the weight of automobiles.

Conventionally, heat exchangers are constructed using one of several methods. One such method utilizes mechanical expansion techniques and has been traditionally used for mass-producing radiators. Mechanical expansion techniques rely solely on the mechanical joining of the components of the heat exchanger to ensure the integrity of the heat exchanger, such as the joining of the tubes to the fins. Advantages of this method of assembly include good mechanical strength and avoidance of joining operations which require a furnace operation, while disadvantages include inferior thermal performance and relatively high weight.

To overcome the disadvantages of the mechanical expansion-type heat exchangers, heat exchangers are increasingly being formed by a brazing operation, wherein the individual components of the heat exchanger are permanently joined together with a brazing alloy. Generally, brazed heat exchangers are lower in weight and are better able to radiate heat as compared to mechanical expansion-type heat exchangers. An example of such a heat exchanger is referred to as the serpentine tube-and-center (STC) type, which involves one or more serpentine-shaped tubes which traverse the heat exchanger in a circuitous manner. The serpentine-shaped tubes are brazed to a number of high surface area finned centers with an inlet and outlet being located at opposite ends of the tube or tubes.

Another type of heat exchanger involves a number of parallel tubes which are brazed to and between a pair of headers, wherein finned centers are brazed between each adjacent pair of tubes. This type of heat exchanger is referred to as the headered tube-and-center (HTC) type. Conventionally, headered tube-and-center type heat exchangers have been constructed by inserting the parallel tubes into apertures formed in each of an opposing pair of headers. A finned center is then positioned between each adjacent pair of parallel tubes. Vessel-like members are placed at each header to form tanks therewith which are in fluidic communication with the tubes through the apertures. The tanks include ports which serve as an inlet and outlet to the heat exchanger. The above individual components are fixtured together before undergoing a furnace brazing operation that permanently joins the components to form the heat exchanger assembly.

One brazing technique which has become accepted by the automotive industry involves an inert atmosphere furnace operation. To crack and displace the aluminum oxide layer which naturally forms on the aluminum alloy tubes, finned centers, headers and tanks, the assembly or its individual components are generally sprayed with or dipped into a flux mixture to enhance the brazeability of the brazing alloy during brazing. A conventional flux mixture consists of about 15 to about 25 volume percent flux solids suspended in water, with a satisfactory type of flux for use with these aluminum alloys being potassium fluoraluminate complexes, as disclosed in U.S. Pat. Nos. 3,951,328 and 3,971,501 to Wallace et al. and Cooke, respectively, as well as others. The assembly is then dried to evaporate the water, leaving only the powdery flux solids on all of the external surface of the assembly.

A disadvantage with conventional flux mixtures used in the spray and dipping techniques is the general inability to consistently deposit these flux mixtures on a limited region of the components being coated. In addition, after evaporation of the aqueous solvent, the flux has a particulate shape which does not adhere well to the surfaces of the heat exchanger. Subsequent handling and assembly of the heat exchanger causes sufficient agitation to shake loose a portion of the flux particulates from the heat exchanger surface.

Another shortcoming associated with the use of the conventional flux mixture is that during brazing, it is extremely important that the furnace atmosphere have a dewpoint of about $-40°$ F. or below and a free oxygen level of about 100 parts per million or less. A common approach has been to employ high purity cryogenic nitrogen. In a high dewpoint or high oxygen-containing atmosphere, a greater amount of oxidation of the aluminum occurs during the brazing cycle, thereby requiring greater quantities of flux. Therefore, with the conventional approach wherein the flux solids are suspended in an aqueous solution, all of the water must be removed prior to the brazing operation. This is difficult to consistently achieve in a production environment. In addition, entrapped moisture and oxygen inside the tanks and tubes of the condenser assembly also impede brazing, thereby requiring complete purging of the assembly just before the brazing operation, which is again costly and difficult to achieve.

The brazing operation is also complicated by the numerous brazements required, particularly when assembling a headered tube-and-center heat exchanger, wherein each tube must be brazed to both headers and its corresponding finned centers during a single brazing operation. Generally, the brazements are achieved by employing an aluminum alloy brazing stock material to form the headers and the finned centers. The aluminum alloy brazing stock material consists, for example, of an appropriate aluminum alloy core which has been clad on at least one side with an aluminum-base brazing alloy. Generally, the brazing alloy has been provided on both surfaces of the finned centers and on only the external side of the header, i.e., the side through which the tubes are inserted.

Typically, the cladding layers are an aluminum-silicon eutectic brazing alloy, such as AA 4045, AA 4047 and AA 4343 aluminum alloys (AA being the designation given by the Aluminum Association), which is characterized by a melting point that is lower than the core aluminum alloy. A suitable aluminum alloy for the core is AA 3003, which nominally contains about 1.2 weight percent manganese, with the balance being substantially aluminum. The brazing operation involves raising the temperature of the assembly such that only the clad layers of brazing alloy melt during the brazing operation. The brazing alloy then flows toward the desired joint regions and, upon cooling, solidifies to form the brazements.

Conventionally, it is known to provide the brazing alloy as 1) a foil which is brazed to the extruded tubes of a serpentine tube-and-center type heat exchanger, 2) a molten coating which is deposited on the extruded tubes, or 3) a liner on an ingot which is hot milled to produce a silicon-clad aluminum alloy foil used to form the finned centers and headers of a headered tube-and-center type heat exchanger or finned centers of a serpentine tube-and-center type heat exchanger.

A shortcoming of the first two above-described processes, the brazed foil and molten coating processes, is that there are two fluxing operations required: the first to adhere the brazing alloy to the tube's aluminum alloy core, and a second to braze the tubes to the finned centers during the braze furnace operation. The need for two fluxing operations is disadvantageous in that the additional flux, its application, removal and the necessary effluent control procedures required to treat the waste water generated by flux removal, all add costs to the final assembly. In addition, the conventional spray and dipping methods required result in the deposition of flux on surfaces of the heat exchanger components which do not serve as braze joint areas and thus do not require flux. The additional flux also aggravates the tendency for the flux to corrode the interior of the furnace, resulting in additional maintenance and repair of the furnace.

Another disadvantage with the brazed foil and molten coating processes is that the silicon within the brazing alloy tends to diffuse into the aluminum alloy core at the elevated temperatures required for the brazing operation. As a result, the corrosion resistance of the brazing alloy is reduced and, due to the reduced silicon content in the brazing alloy, the furnace temperatures required to melt the brazing alloy are higher.

In addition, a shortcoming of the above-described hot milled method is that silicon clad aluminum alloy center stock material which is less than about 0.004 inch thick is difficult to obtain commercially, therefore generally resulting in undesirable additional weight to the heat exchanger. Another shortcoming is that relatively few aluminum suppliers can provide clad aluminum, and then generally only in large volumes, which is particularly burdensome to low-volume manufacturers. Further, the silicon clad aluminum alloy centers are more difficult to machine, thereby significantly reducing tool life.

Lastly, the general practice of cladding the aluminum alloy core with an aluminum-silicon brazing alloy tends to be disadvantageous in that the silicon content of the clad brazing alloy may vary significantly. For example, in the more commonly used brazing alloys, the silicon content can vary between about 9 and 11 weight percent for the AA 4045 alloy, between about 11 and 13 weight percent for the AA 4047 alloy, and between about 6.8 and 8.2 weight percent for the AA 4343 alloy. For every one weight percent variation in silicon within the brazing alloy, the melt temperature of the brazing alloy can vary by about 10° F. This variability in silicon content significantly complicates the process control for the subsequent furnace braze operation.

From the above, it is apparent that it would be desirable to provide a method for furnace brazing a heat exchanger that alleviates the use of an aluminum alloy core material which is clad with a brazing alloy. In addition, it would be desirable to limit the quantity of flux applied to those regions of the heat exchanger which serve as joining sites, particularly the tube-to-header joints and the tube-to-fin joints of a headered tube-and-center type heat exchanger.

Therefore it would be advantageous to provide an improved method for brazing serpentine tube-and-center type and headered tube-and-center type heat exchangers, wherein both the brazing alloy and a minimum quantity of flux can be selectively applied together to the braze joints of the heat exchanger during assembly, so as to enhance the brazing of the internal and external joints. By improving the uniformity and consistency of the internal brazed joints, the resultant integrity of the leak-proof brazed assemblies should be significantly enhanced. In addition, it would also be advantageous to eliminate the practice of suspending the flux in an aqueous solution, so as to minimize the amount of moisture surrounding the assembly during the brazing operation, thereby optimizing the integrity of the brazing procedure.

SUMMARY OF THE INVENTION

It is an object of this invention to provide a method for assembling a brazed heat exchanger unit, such as a condenser for use in an automotive air conditioning system.

It is a further object of this invention that such a method for assembly employ a novel flux-coated brazing alloy member which can be selectively positioned at a braze joint of the heat exchanger unit, so as to eliminate the requirement for assembling the heat exchanger with components which are clad with a brazing alloy, as well as to eliminate the requirement for applying a liquid flux mixture on the heat exchanger components for the purpose of enhancing brazeability.

It is another object of this invention that such a flux-coated brazing alloy member be formed from an annular-shaped brazing alloy member onto which a hard flux coating is deposited such that the flux coating tenaciously adheres to the surface of the brazing alloy member, so as to permit handling the flux-coated brazing alloy member without a significant loss of flux.

It is still a further object of this invention that, in the use of the flux-coated brazing alloy member, the flux coating is disposed between the brazing alloy member and the braze joint to be brazed, so as to promote complete and consistent brazing, produce high integrity braze joints, and minimize the number of defective assemblies due to leaky internal joints.

It is yet another object of this invention that such a method be adaptable to soldering techniques, wherein a novel flux-coated soldering alloy member may be selectively positioned at a solder joint of an assembly, so as to enable subsequent soldering to be performed with a minimal amount of flux present on the assembly for the purpose of enhancing solderability.

In accordance with a preferred embodiment of this invention, these and other objects and advantages are accomplished as follows.

According to the present invention, an improved method is provided for assembling and brazing a heat exchanger unit which is suitable for use in automotive applications, such as the condenser for an air conditioning system. The method utilizes a novel flux-coated brazing alloy member that can be assembled onto each tube of the heat exchanger unit. In particular, the flux-coated brazing alloy member may be readily positioned at each of the braze joints of the heat exchanger in order to accurately provide the amount of brazing alloy and flux which is required to form a given braze joint. The flux-coated brazing alloy member is specifically adapted for use with clad-free components of the heat exchanger, in that the brazing alloy constituent of the flux-coated brazing alloy member is provided in lieu of conventional cladding. By substituting a suitable soldering alloy for the brazing alloy, the present invention can also be advantageously employed in a soldering operation to achieve similar results.

The flux-coated brazing alloy member of this invention consists of a conventional brazing alloy, such as an aluminum-silicon alloy, which is generally formed in the shape of a band or ring. For a soldering operation, a conventional soldering alloy, such as a zinc-aluminum alloy, would be substituted for the brazing alloy to form the ring. A flux-containing material is then deposited on the surface of the ring, so as to form a hard coating which will tenaciously adhere to the surface of the ring. The flux-containing material preferably contains a suitable flux compound, such as potassium cesium tetrafluoroaluminate particles, which is dispersed in an adhesive binder that will readily volatilize during the brazing (or soldering) operation. The adhesive binder is preferably formed by dissolving a natural resin with an alcohol or a water soluble epoxy resin in water.

The method of this invention is equally applicable to the formation of both serpentine and headered tube-and-center type heat exchangers, as well as other brazed assemblies which involve brazing an aluminum-base tube to a second aluminum-base member. The teachings of this invention are also applicable to the formation of assemblies which involve soldering an aluminum-base tube to a second aluminum-base member. Generally, an assembly and brazing method which incorporates the teachings of this invention will include the following steps.

First, the flux-coated brazing alloy member is made by forming an annular-shaped band member from a preferred brazing alloy. The flux coating is then deposited on the band member in the form of a slurry, and the flux coating is dried to form a hard coating which preferably covers and tenaciously adheres to the entire external surface of the band member. The character of the flux coating is such that the flux-coated brazing alloy member can be handled without significant loss of the flux compound.

The flux-coated brazing alloy member is then slipped onto an aluminum-base tube of the desired brazed assembly. Preferably, the final dimensions of the flux-coated brazing alloy member provide a close fit with the outer diameter of the tube. The tube is then assembled with an appropriate aluminum-base member such that the flux-coated brazing alloy member is positioned at the braze joint formed between the tube and the aluminum-base member. Importantly, the flux coating is deposited on the band member such that at least a portion of the flux coating is disposed between the aluminum-base tube and the brazing alloy of the flux-coated brazing alloy member, so as to promote the cleansing action of the flux compound.

The assembly, or at least the tube, aluminum-base member and flux-coated brazing alloy member are heated at a temperature and for a duration which are sufficient to melt the flux compound and the brazing alloy, such that the tube is brazed to the aluminum-base member to form a brazed assembly.

An advantage to the present invention is that the above method enables the flux compound and the brazing alloy to be selectively placed at the braze joints of an assembly, such that the use of excessive flux and brazing alloy is substantially eliminated. In particular, the flux compound is present between the brazing alloy and the braze joint, so as to promote the removal of oxides from the braze joint prior to its contact with the brazing alloy.

Through discriminate use of flux, problems associated with excessive flux present during the brazing process, such as the expense of using large quantities of flux, removing the excess flux, and treating the waste water generated during flux removal, are substantially avoided. In addition, the tendency for excess flux to corrode the interior of the brazing furnace is also avoided. Furthermore, the need to dry the flux prior to the brazing operation is also eliminated in that the flux is not suspended in water. As a result, the method of this invention does not contribute to additional moisture around the assembly during brazing, which could detrimentally cause oxide buildup on the brazed surfaces and thereby hinder the formation of high quality brazed joints.

Another advantage to the present invention is that the components of the heat exchanger do not require a brazing alloy cladding. In particular, unclad components are relatively less expensive and are more readily machinable. The elimination of clad aluminum alloys is particularly advantageous for low-volume manufacturers in that such manufacturers are not forced to make large quantity purchases, which would otherwise tend to be commercially necessary.

In addition, the teachings of this invention are also applicable to soldering techniques, requiring only that a suitable soldering alloy be substituted for the brazing alloy for the flux-coated brazing alloy member.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawing wherein.

DETAILED DESCRIPTION OF THE INVENTION

An improved method is provided for assembling and brazing a heat exchanger which is suitable for automotive applications. Such a heat exchanger is particularly adapted for use as the condenser of an automobile air conditioning system. The method of the present invention utilizes a novel flux-coated alloy member that is particularly adapted to be selectively positioned at the braze joints of a tube-and-center type heat exchanger. The flux-coated alloy member is suitably sized and shaped to place a predetermined quantity of flux compound and brazing alloy at the braze joints, so as to avoid the presence of excess flux compound and brazing alloy which may otherwise have a detrimental effect on the quality of the braze joints subsequently formed during a brazing operation.

While the present invention will be described in the context of a brazed heat exchanger assembly, those skilled in the art will recognize that the teachings of this invention are also applicable to other brazed assemblies, as well as soldering techniques. Where appropriate, modifications which are necessary to adapt the present invention to soldering processes will be noted.

Figure 1:
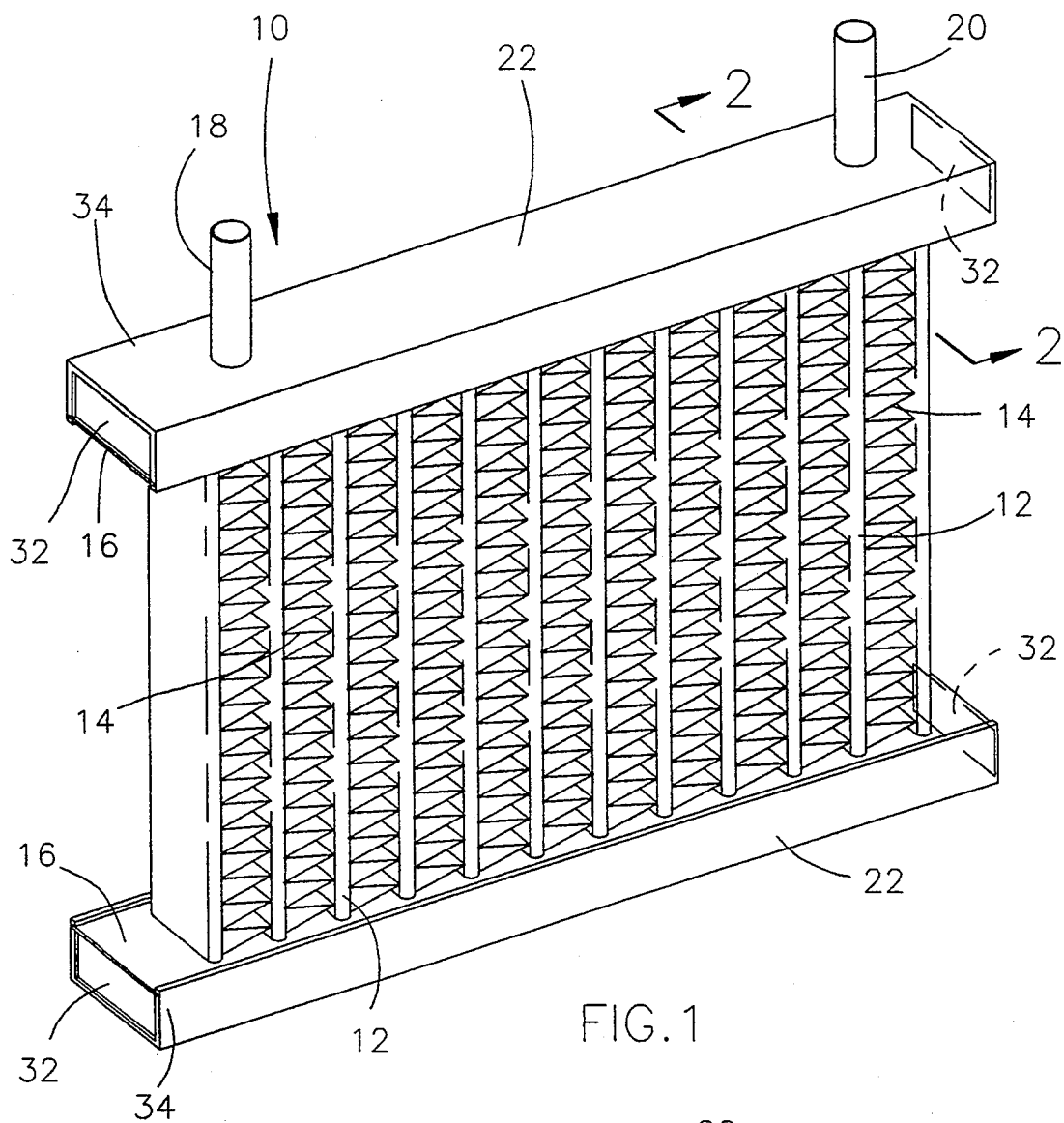
FIG. 1 illustrates a perspective view of a headered tube-and-center type heat exchanger unit formed in accordance with the assembly method of this invention.

Shown in FIG. 1 is a perspective view of a conventional headered tube-and-center type heat exchanger unit 10 which was formed in accordance with the improved assembly method of this invention. The headered tube-and-center design illustrated in FIG. 1 is preferred for air conditioning condensers, in that the design maximizes the amount of surface area that is in contact with incoming air. The air is forced around the high surface area provided by finned centers 14 located between adjacent pairs of heat exchanger tubes 12, providing for a high heat exchange rate between the air and a suitable fluid which flows through the tubes 12. The tubes 12 are oriented to be geometrically in parallel with each other as well as hydraulically in parallel.

Also shown are an inlet 18 and outlet 20 provided in fluidic communication with a pair of reservoir tanks 22. Each reservoir tank is formed with a tank member 34 in combination with a header 16 and a pair of end plates 32. Typically, each reservoir tank 22 is partitioned with separators (not shown) to form a number of individual reservoir tanks (not shown). The tubes 12, the inlet 18, the outlet 20, and the reservoir tanks 22 form a continuous and circuitous fluidic path through the heat exchanger 10 for the fluid.

Figure 2:
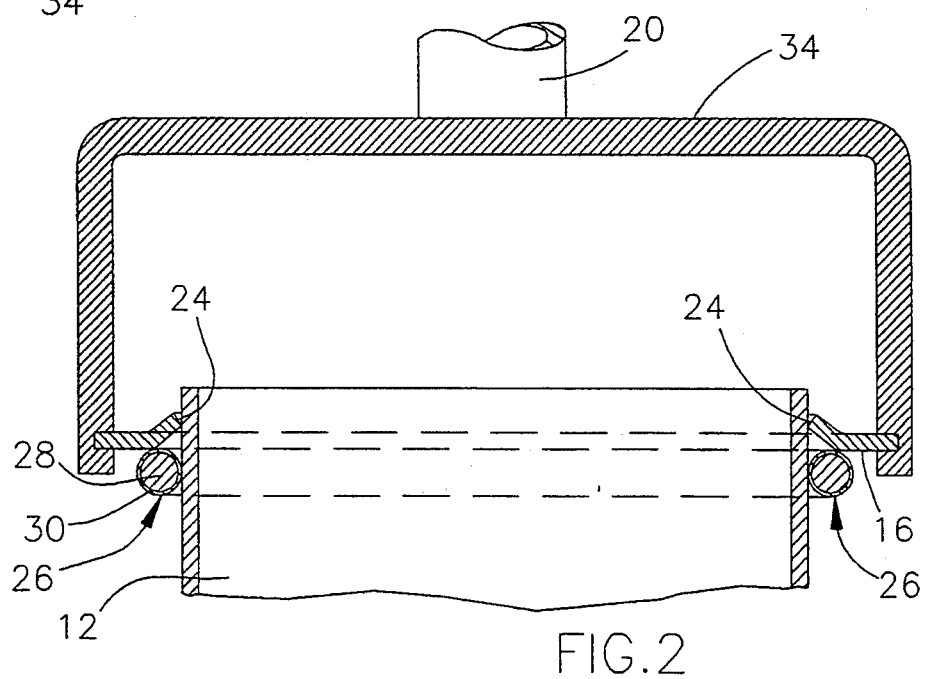
FIG. 2 is a cross-sectional view along line 2—2 of FIG. 1 showing the assembly of a header, tube and tank member, and illustrating the preferred placement of a flux-coated brazing alloy member in accordance with a preferred embodiment of this invention.

Shown in greater detail in FIG. 2 is an illustrative region in cross-section of one of the headers 16 with a tube 12 inserted within a corresponding aperture 24 formed in the header 16. Each header 16 is stamped and pierced from a suitable aluminum alloy material so as to have an elongate shape with a number of evenly spaced apertures 24. A preferred alloy for the header 16 is aluminum alloy AA 3003, as designated by the Aluminum Association (AA), though other similar aluminum alloys could be employed. The tubes 12 are also preferably formed from an aluminum alloy, such as AA 3003, and are typically formed as extrusions which exceed the necessary tube length for assembling to the headers 16. Generally speaking, aluminum alloy AA 3003 has been found to perform satisfactorily and can be easily stamped to form the headers 16 and extruded to form the tubes 12, as well as being suitable to form the finned centers 14 and the tank members 34. In addition, there are no inherent brazing difficulties associated with the use of this particular alloy and the structural integrity of the material during use has generally been found to be sufficient.

In accordance with the teachings of this invention, and contrary to the prior art, the aluminum alloy from which the headers 16 and tubes 12 are formed is not clad with an aluminum-silicon brazing alloy. As seen in FIG. 2, an inventive feature of this invention is that predetermined amounts of a flux compound and a brazing alloy are placed at the braze joint between each tube 12 and its corresponding header 16 in the form of a flux-coated alloy member 26. Specifically, FIG. 2 depicts the placement of the flux-coated alloy member 26 prior to a brazing operation. Such a flux-coated alloy member 26 is physically placed on each tube 12 to provide the brazing alloy required to form the braze fillets between the tube 12 and header 16, as well as to provide the flux required to enhance the brazeability of the tube 12 and header 16.

The preferred flux-coated alloy member 26 is composed of a core 28 formed from a suitable brazing alloy, onto which a flux-containing compound is applied, so as to form a flux coating 30 which preferably covers the entire exposed surface of the core 28. More specifically, the flux coating 30 is deposited on the core 28 such that at least a portion of the flux coating 30 will be disposed between the braze joint and the core 28, so as to enhance the cleansing action of the flux component of the flux-containing compound.

A preferred brazing alloy is an aluminum-silicon alloy, such as AA 4047, AA 4145 and AA 4245, as designated by the Aluminum Association (AA), although other aluminum brazing alloys may also be used. The quantity of silicon present, as a result of the particular alloy used for the core 28, will determine the melting point for the core 28. Specifically, silicon serves to lower the melting point of the core 28 below that of the aluminum alloy from which the headers 16, tubes 12, tank members 34 and finned centers 14 are made, such that the brazing operation can be performed without an adverse structural or metallurgical effect on the aluminum alloy.

Alternatively, where the flux-coated alloy member 26 is intended for use in a soldering application, a preferred alloy is a zinc-aluminum soldering alloy containing up to about ten weight percent aluminum, with the balance being essentially zinc. More particularly, the aluminum present in the soldering alloy preferably is held at about two to about three weight percent. As is conventional, the melting temperature of the preferred zinc-aluminum alloy is compatible with soldering temperatures, which are generally below about 425° C., while the melting temperatures of the preferred aluminum-silicon alloys are compatible with brazing temperatures; which are generally above about 425° C.

The preferred flux component of the flux-containing compound which forms the flux coating 30 is potassium cesium tetrafluoroaluminate ($KCsAlF_4$) and/or potassium tetrafluoroaluminate ($KAlF_4$), which is preferably present within the flux coating 30 in a range of from about 12 to about 52 weight percent. Potassium cesium tetrafluoroaluminate is most preferred as the flux component for the flux coating 30 because the presence of the cesium within the compound lowers the melting temperature of the flux, as compared to the use of potassium tetrafluoroaluminate. However, either compound has proven itself to be reliable with aluminum alloys of the type employed in the heat exchanger 10, and after brazing and upon solidification, they form a non-corrosive, glassy, ceramic residue which does not impair the operation of the heat exchanger 10. In addition, the preferred flux components are capable of cracking and displacing the aluminum oxides at the brazing temperatures while remaining essentially inert with respect to the aluminum at such temperatures. Since fluxes are reactive to remove the oxide only when at least partially molten, the flux component of the flux coating 30 must be partly or wholly molten at brazing temperatures. The preferred potassium cesium tetrafluoroaluminate and potassium tetrafluoroaluminate flux compounds meet these requirements.

Most preferably, the particle size of the preferred flux compounds should be about 8 to about 15 microns so as to form a substantially smooth flux coating 30 on the core 28. In addition, the purity of the flux component should be a minimum of about 96 weight percent tetrafluoroaluminate, $ALF_4$, as the presence of $ALF_3$ or $ALF_6$ within the flux compound may tend to be too reactive and corrosive.

The preferred amount of the flux compound within the flux coating 30 for a given application is dependent on the quality of the brazing atmosphere. Very low oxygen levels of less than about 10 ppm allows the use of an amount of the flux toward the lower end of the stated range, while oxygen levels on the order of about 100 ppm dictate the use of an amount of the flux toward the upper end of the range.

The flux coating 30 of this invention also includes from about 25 to about 75 weight percent of a binder, preferably a natural resin such as water-white rosin or gum lac. Such natural resins are utilized in accordance with the teachings of this invention because they are capable of cleanly volatilizing before the flux coating 30 and the core 28 melt. The natural resins encompassed by the present invention are alcohol soluble and water insoluble. Though water-white rosin and gum lac are the preferred resins of this invention, it is foreseeable that other alcohol-soluble natural resins could also be employed.

Alternatively, a water soluble epoxy resin can be substituted for the natural resin in the flux coating 30. Such epoxy resins are well known and commercially available, and can be used in the same proportions relative to the flux compound as the natural resins noted above. Used at these ratios, water soluble epoxy resins have exhibited excellent properties in terms of their volatility at brazing temperatures, as well as their ability to hold the flux-containing compound in a cohesive state while it is being applied to the heat exchanger components, and thereafter to transform the flux-containing compound into the hard flux coating 30.

Prior to forming the flux coating 30, the preferred flux component is dispersed in the binder. Where the binder is one of the preferred natural resins, the binder is first dissolved in one or more suitable alcohols, such as methyl alcohol, ethyl alcohol and/or isopropyl alcohol. Such alcohols are preferred because they volatilize readily, such that the flux coating 30 is hard and is very adherent to the core 28. The preferred quantity of alcohol used will depend upon the quantity of the other constituents present. Specifically, the alcohol must allow the flux-containing compound to be sufficiently viscous so as to provide the desired cohesive action between the flux component and the core 28, while also being sufficiently fluid so as to permit easy and consistent application of the flux-containing compound onto the core 28. The amount of alcohol used will also determine the method by which the flux-containing compound is deposited on the core 28. Generally, the natural resin will be dissolved in a sufficient amount of alcohol such that the natural resin constitutes about 5 to about 25 weight percent of the resin/alcohol solution. Within this range, the handling characteristics of the solution with the addition of the flux component will be such that the resulting flux-containing compound is very viscous, enabling the mixture to be applied to the core 28 by casting, brushing and/or immersion techniques.

Alternatively, where the binder is a water soluble epoxy resin, the binder will be dissolved in a sufficient amount of water so as to achieve essentially the same consistency as that desired for the natural resin, as described above.

The binder serves to hold the flux-containing compound in a cohesive state while it is being applied to the heat exchanger components and thereafter until the alcohol or water is volatilized or otherwise evaporated. Afterwards, the binder transforms the flux-containing compound into the hard flux coating 30, which enables the flux-coated alloy member 26 to be handled either by hand or with conventional handling equipment without concern for the loss of significant amounts of the flux component or the flux coating 30 itself. The binder ensures that the flux coating 30 will tenaciously adhere to the core 28 until the flux-coated alloy member 26 is sufficiently heated to melt both the flux coating 30 and the core 28.

Figure 3:
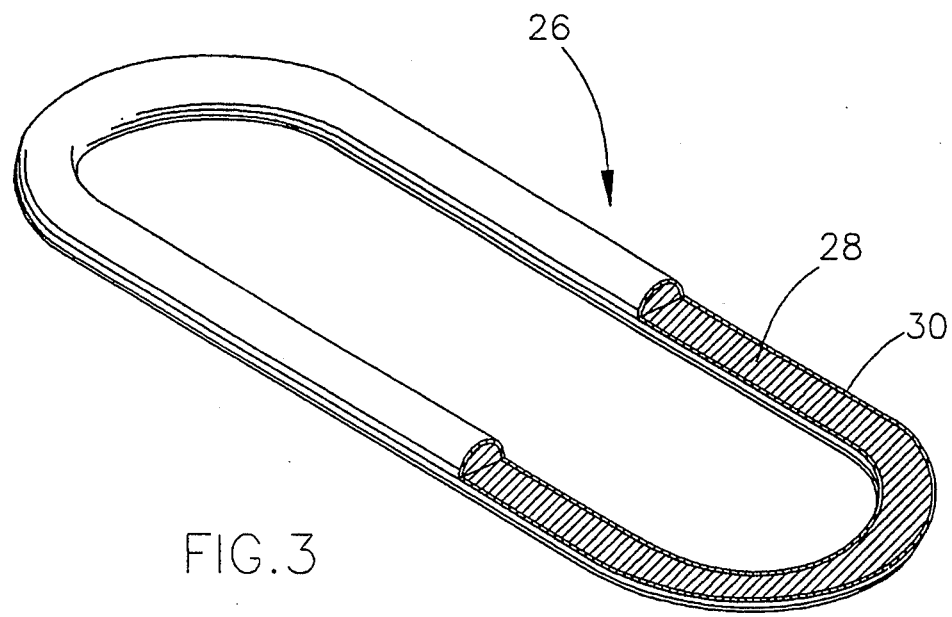
FIG. 3 is a perspective partial cross-sectional view of the flux-coated brazing alloy member of FIG. 2.
Figure 4:
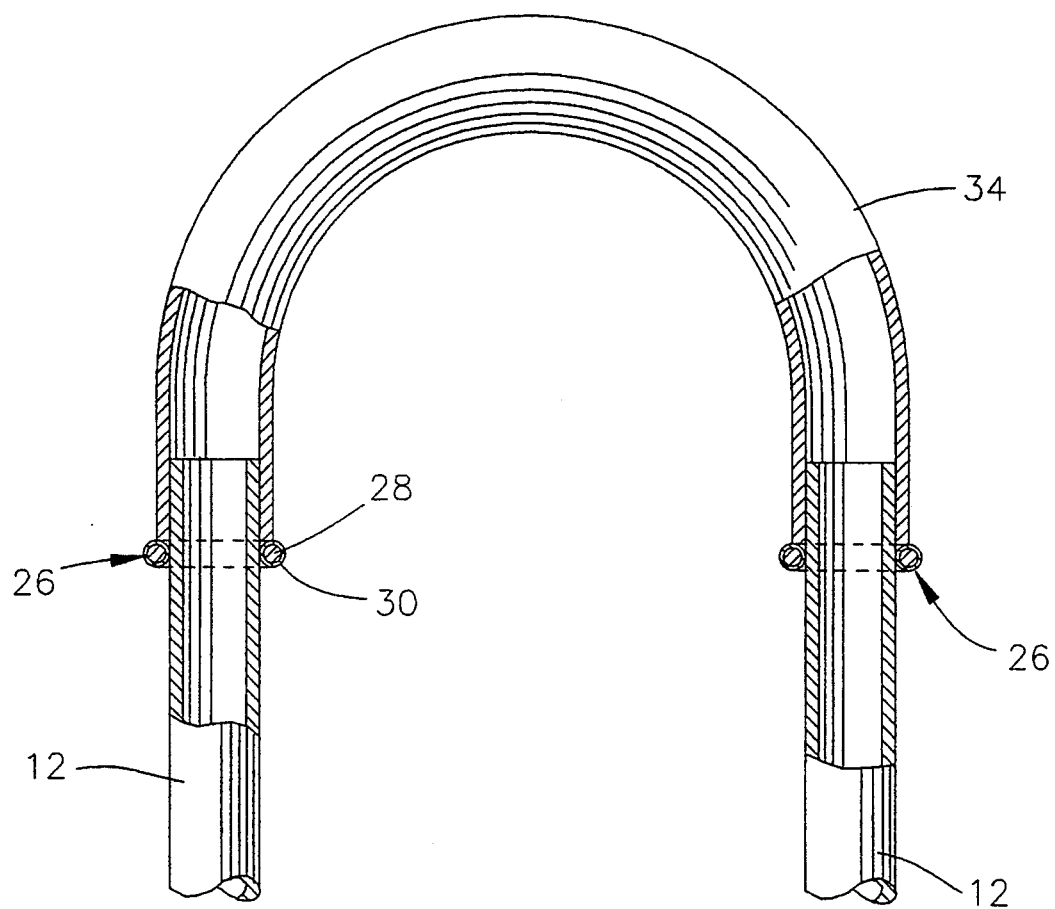
FIG. 4 is a partial cross-sectional view of a section of a serpentine tube-and-center type heat exchanger unit, and illustrating the preferred placement of a pair of flux-coated brazing alloy members in accordance with a preferred embodiment of this invention.

The size and shape of the flux-coated alloy member 26 will generally depend on the particular application. For the heat exchanger 10 shown in FIGS. 1 and 2, and as shown in greater detail in FIG. 3, the flux-coated alloy member 26 has a substantially oval shape so as to conform to the cross-sectional shape of the particular tubes used. In contrast, FIG. 4 shows a pair of circular-shaped flux-coated alloy members 26 assembled onto a correspondingly-shaped pair of tubes 12, such as for a serpentine tube-and-center type heat exchanger. As illustrated, the tubes 12 are to be brazed to a return bend 34, as may be done to form such heat exchangers.

The cross-sectional thickness of the flux-coated alloy member 26 may also vary in accordance with the particular requirements of an application. Generally, a cross-sectional thickness of about 0.035 to about 0.5 millimeters for the core 28 will provide sufficient brazing alloy to form the braze fillets required for a typical braze joint of the heat exchanger 10 used as the condenser of an automobile air conditioning system. Furthermore, a thickness of about 0.035 to about 0.5 millimeters for the flux coating 30 will typically be sufficient to provide the cleansing action necessary to enhance the brazeability of the tubes 12 and headers 16 of such a heat exchanger. As will be apparent to those skilled in the art, the amount of flux compound present at a braze joint must be sufficient to deoxidize and wet the surface of the header 16 at each aperture 24 for formation of the brazed joints with the tubes 12. Accordingly, it is entirely foreseeable that the size, shape and thicknesses of the individual constituents of the flux-coated alloy member 26 may vary widely in order to perform suitably for a given application, depending in part on the size of the heat exchanger unit 10 and its individual components.

Using the flux-coated alloy member 26 formed in accordance with the above, the assembly and brazing of the heat exchanger assembly 10 is preferably performed as follows. The tubes 12 and headers 16 can each be formed in a conventional manner, e.g., stamping for the headers 16 and extruding for the tubes 12, and from a suitable aluminum alloy, such as AA 3003, although other forming methods and materials could be used. A flux-coated alloy member 26 formed in accordance with this invention is then placed at each end of each tube 12, approximately at the point where a braze joint is to be formed with a header 16. The ends of the tubes 12 can then be inserted into corresponding apertures 24 in the headers 16, such that the flux-coated alloy members 26 are each accurately located at the resulting braze joint, as shown in FIG. 2. Once assembled, the tubes 12 will extend in geometric and hydraulic parallel between the headers 16, as shown in FIG. 1.

By positioning the flux-coated alloy member 26 at the braze joints between the headers 16 and tubes 12, the flux component and brazing alloy are in a most efficient location to form high quality brazed joints. In particular, because the flux coating 30 is deposited on the core 28 such that at least a portion of the flux coating 30 is disposed between the braze joint and the core 28, the cleansing ability of the flux component is significantly enhanced during the brazing cycle. The flux component removes the oxide ordinarily present on the exposed aluminum surfaces of the tubes 12 and headers 16, particularly at the internal and external joints, promotes the flow of the molten brazing alloy, and inhibits further oxide formation on the region of the braze joint.

Because the flux coating 30 on the flux-coated alloy member 26 is dry, there is no requirement to dry the tubes 12 and headers 16 after assembly, as is required when conventional water-suspended flux compositions are used. At this point, the individual tubes 12 and headers 16 can be brazed together, with assembly of the remaining components, i.e., the finned centers 14, tank members 36, inlet 18 and outlet 20, being performed subsequently, although it is foreseeable that the assembly method of this invention could be modified to allow brazing of all components during a single brazing operation.

The preassembled heat exchanger 10, consisting of at least the headers 16 and tubes 12, is brazed in a controlled atmosphere brazing furnace, preferably with a high purity nitrogen atmosphere, using a brazing cycle which is conventional for an aluminum-silicon brazing alloy. During the brazing operation the dewpoint of the nitrogen atmosphere is preferably maintained below about −40° F. and the free oxygen level is preferably maintained below about 100 ppm. Brazing preferably occurs in a controlled atmosphere so as to reduce or eliminate the formation of a detrimental oxide layer, and to facilitate the concurrent brazing of the numerous brazed joints within the heat exchanger 10, which may not be possible with other forms of brazing, such as dip brazing or wire brazing techniques. However, though controlled atmosphere furnace brazing is highly preferred as the method for forming the heat exchanger 10 because of these practical concerns, other alternative methods for brazing may also be utilized.

The heat exchanger 10 is preferably heated to a temperature from about 1040° F. to about 1130° F., whereupon the flux-coated alloy member 26 melts, such that the flux component provides the cleansing action necessary to enhance the brazeability of the tubes 12 and headers 16, and the brazing alloy is drawn by capillary action towards the seams at the desired braze joints, so as to fill the internal and external joints in the assembly. The preferred binders will readily and cleanly volatilize during the brazing operation. Upon cooling, the brazing alloy will solidify to form the braze bond required to seal the joints and bond the tubes 12 and headers 16 together, forming a leak-proof, structurally-sound brazement. After a few more minutes, such as about three to six minutes, at peak temperature, the heat exchanger 10 is cooled to about 950° F. for a minute or two, to allow for equilibration of the brazed joints, and then cooled very rapidly to room temperature.

From the above, it can be seen that a particularly advantageous feature of this invention is that the flux-coated alloy member 26 can be readily formed and handled, as well as easily positioned on the tubes 12 without concern for the loss of flux during the subsequent assembly and brazing of the heat exchanger 10. Further, the ability to selectively place the flux-coated alloy member 26 on the tubes 12 enables appropriate amounts of the flux component and the brazing alloy to be accurately and selectively placed at the external surfaces which define the braze joints of the heat exchanger assembly 10. In particular, the flux-coated alloy member 26 provides the flux component between the brazing alloy and the braze joint. As a result, the integrity of the brazements which join the heat exchanger 10 is promoted without the use of excessive flux.

Accordingly, the assembly method of this invention is also advantageous in that, by limiting the amount of flux present during the brazing operation, the tendency for the flux to corrode the interior of the brazing furnace is also significantly reduced, such that furnace life will generally be extended and furnace maintenance will generally be reduced. In addition, other problems associated with excessive flux, such as procedures required to remove the excess flux and treat the waste water generated during flux removal, are substantially avoided.

In addition, the need to dry the flux prior to the brazing operation is eliminated since water is not required to form the flux coating 30. Accordingly, the conventional requirement to dry the assembly prior to brazing is eliminated, and additional moisture is not contributed to the brazing atmosphere. As previously noted, the absence of moisture avoids the detrimental oxide buildup which tends to form on the brazed surfaces when moisture is present, thereby hindering the formation of high quality brazed joints. The absence of water also eliminates the need for internal flux flushing or nitrogen purging prior to brazing.

Another advantage to the use of the flux-coated alloy member 26 of this invention is that the components of the heat exchanger 10 do not require a brazing alloy cladding, such that weight of the heat exchanger 10 may be significantly reduced. Unclad components are also more readily machined, thereby improving the tool life. Finally, the avoidance of requiring clad aluminum alloys is particularly advantageous for low-volume manufacturers in that such manufacturers are not compelled to make large quantity purchases.

In addition, the teachings of this invention are also applicable to soldering techniques, requiring only that a suitable soldering alloy be used as the material of the core 28 for the flux-coated brazing alloy member 26, and appropriately adjusting the temperature at which joining occurs to correspond to the melting temperature of the soldering alloy.

While our invention has been described in terms of a preferred embodiment, it is apparent that other forms could be adopted by one skilled in the art, such as by modifying the preferred quantity of the individual constituents of the flux coating 30; or by modifying the shape or the cross-section of the flux-coated alloy member 26; or by cladding the core aluminum alloy from which the headers, tubes and finned centers are formed; or by modifying the processing steps or heat exchanger design employed. Accordingly, the scope of our invention is to be limited only by the following claims.

The embodiments of the invention in which an exclusive property or privilege is claimed are defined as follows:

1. A flux-coated alloy member for selectively placing a flux compound between an aluminum-containing alloy and a joint of an assembly which is to be joined by heating the assembly to a temperature which is above the melting temperature of the alloy and less than the melting temperature of the assembly, the flux-coated alloy member comprising:
   a band member formed from the alloy, the band member having a substantially annular shape; and
   a flux coating adhered to substantially all external surfaces of the band member so as to form a continuous, substantially dry and solid coating on the band member such that the flux-coated alloy member can be handled without deterioration of the flux coating, the flux coating comprising the flux compound dispersed in an adhesive binder wherein the adhesive binder constitutes about 25 to about 75 weight percent of the flux coating, the flux compound being composed of at least about 96 weight percent of a tetrafluoroaluminate compound whose particle size is in the range of about 8 to about 15 microns in size, the adhesive binder being selected from the group consisting of natural resins and water-soluble epoxy resins;
   whereby the flux-coated alloy member enables the flux compound to be selectively placed at the joint of the assembly so as to substantially eliminate the presence of excess flux compound at the joint.

2. A flux-coated alloy member as recited in claim 1 wherein the alloy is a soldering alloy comprising up to about ten weight percent aluminum, with the balance being substantially zinc.

3. A flux-coated alloy member as recited in claim 1 wherein the alloy is an aluminum-silicon brazing alloy.

4. A flux-coated alloy member as recited in claim 1 wherein the band member is formed from a powder composed of the alloy.

5. A flux-coated alloy member as recited in claim 1 wherein the flux compound comprises potassium cesium tetrafluoroaluminate.

6. A flux-coated alloy member as recited in claim 1 wherein the adhesive binder comprises a natural resin.

7. A flux-coated alloy member as recited in claim 6 wherein the adhesive binder comprises a water soluble epoxy resin.

8. A flux-coated brazing ring for selectively placing a flux compound and an aluminum-containing brazing alloy at a brazing location of an aluminum alloy tube for a heat exchanger assembly, the flux-coated brazing ring comprising:
   an annular member formed from an aluminum-containing brazing alloy, the annular member having a substantially round cross-section; and
   a flux coating adhered to substantially all external surfaces of the annular member so as to form a continuous, substantially dry and solid coating on the annular member such that the flux-coated alloy member can be handled without deterioration of the flux coating, the flux coating comprising the flux compound dispersed in a natural resin wherein the resin constitutes about 25 to about 75 weight percent of the flux coating, the flux compound being composed of at least about 96 weight percent of a tetrafluoroaluminate compound whose particle size is in the range of about 8 to about 15 microns in size;
   whereby the flux-coated brazing ring enables the flux compound to be selectively placed on the tube so as to substantially eliminate the presence of excess flux compound at the brazing location.

9. A flux-coated brazing ring as recited in claim 8 wherein the brazing alloy is an aluminum-silicon brazing alloy.

10. A flux-coated brazing ring as recited in claim 8 wherein the annular member is formed from a powder composed of the brazing alloy.

11. A flux-coated brazing ring as recited in claim 8 wherein the flux compound comprises potassium cesium tetrafluoroaluminate.

12. A flux-coated brazing member as recited in claim 8 wherein the natural resin is selected from the group consisting of water-white rosin and shellac.

13. A flux-coated brazing member as recited in claim 8 wherein the flux coating is about 0.035 to about 0.5 millimeters thick.

* * * * *